United States Patent
Yokoyama

(10) Patent No.: US 6,763,138 B1
(45) Date of Patent: Jul. 13, 2004

(54) METHOD AND APPARATUS FOR CODING MOVING PICTURE AT VARIABLE BIT RATE

(75) Inventor: Yutaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/522,999

(22) Filed: Mar. 9, 2000

(30) Foreign Application Priority Data

Mar. 11, 1999 (JP) .......................................... 11-064723

(51) Int. Cl.$^7$ ............................. G06K 9/36; G06K 9/46
(52) U.S. Cl. ..................... 382/236; 382/232; 382/251
(58) Field of Search ............................... 382/232, 236, 382/238, 239, 248, 251, 244, 245, 246; 348/699; 375/240.03, 240.05, 240.12, 240.18, 240.23, 240.16, 245

(56) References Cited

U.S. PATENT DOCUMENTS

| | | | | |
|---|---|---|---|---|
| 5,802,213 A | * | 9/1998 | Gardos | 382/239 |
| 5,835,149 A | * | 11/1998 | Astle | 375/240.05 |
| 5,999,218 A | * | 12/1999 | Yokoyama | 375/240.05 |
| 6,026,190 A | * | 2/2000 | Astle | 382/232 |
| 6,044,115 A | * | 3/2000 | Horiike et al. | 375/240.05 |
| 6,078,618 A | * | 6/2000 | Yokoyama et al. | 375/240 |
| 6,259,739 B1 | * | 7/2001 | Kondo | 382/248 |

FOREIGN PATENT DOCUMENTS

| | | |
|---|---|---|
| JP | 6-78281 | 3/1994 |
| JP | 8-149413 | 6/1996 |
| JP | 9-294267 | 11/1997 |
| JP | 10-164582 | 6/1998 |
| JP | 10-215460 | 8/1998 |

* cited by examiner

Primary Examiner—Leo Boudreau
Assistant Examiner—Duy M. Dang
(74) Attorney, Agent, or Firm—Whitham, Curtis & Christofferson, PC

(57) ABSTRACT

To provide a picture coding method and apparatus capable of achieving a high image quality coding and executing a variable bit rate coding in real time. A moving picture coding means codes input moving picture data with a quantization scale Qj given from an average bit rate adjusting means. Then, the moving picture coding means outputs a code quantity Sj towards a GOP complexity computing means and an average complexity computing means. The GOP complexity is calculated on the basis of quantization scale and code quantity in the coded GOP, while the average complexity is calculated on the basis of quantization scale and code quantity from the beginning to the present. Quantization scale Qgop is calculated on the basis of the GOP complexity and the average complexity. The average bit rate adjusting means modifies Qgop and determines quantization scale Qj in accordance with an excess or shortage of Sj.

40 Claims, 10 Drawing Sheets

METHOD AND APPARATUS FOR CODING MOVING PICTURE AT VARIABLE BIT RATE

BACKGROUND OF THE INVENTION

1. Technical Field of the Invention

The present invention relates to a method and apparatus for coding moving pictures at a variable bit rate, and more particularly to a method and apparatus for coding moving pictures at a variable bit rate, which can control a code quantity at a variable bit rate in real time.

2. Description of the Prior Art

MPEG-2 (ISO-IEC-13818-2) has been typically known as a method of coding moving pictures with a high efficiency in the art. In this method, a picture is divided into blocks each consisting of a group of plural pixels, and each block is subject to the discrete cosine transform (DCT) to transform a signal in a spatial domain into a signal in a frequency domain. Each frequency component obtained from the discrete cosine transform, which is called a "DCT coefficient", is quantized with a predetermined quantization scale, then coded in a variable length by assigning a variable length code to a quantized transform coefficient, and output as a bit stream of coded data.

FIG. 10 is a block diagram showing an arrangement of a conventional moving picture coding method for explaining an moving picture coding method on the basis of MPEG-2 (ISO-IEC-13818-2). The moving picture coding method comprises, as shown in FIG. 10, subtracter 501, discrete cosine transform (DCT) means 502, quantization means 503, variable length coder 504, bit rate controller 505, inverse quantization means 506, inverse DCT means 507, adder 508, frame memory 509, motion compensation interframe predictor 510 and selector 511.

Input images are classified into an I-picture which is encoded with intra-frame coding, a P-picture which is encoded with interframe prediction coding with only a forward prediction, and a B-picture which is encoded with bi-directional or forward and backward predictions. The input images are divided into macro blocks each consisting of 16×16 pixels and are coded on macro block basis.

First, in the I-picture, the intra-frame coding is performed without interframe prediction. At this moment, selector 511 selects a signal value "0" as a predicted value, and subtracter 501 outputs the same value as the signal value of the input image. An output signal value from subtracter 501 is transformed through the discrete cosine transform at DCT means 502 into a DCT coefficient, which is outputted toward quantization means 503. The DCT coefficient is quantized at quantization means 503 with a predetermined quantization scale.

The DCT coefficient quantized at quantization means 503 is output as a quantized transform coefficient to variable length coder 504, where the quantized transform coefficient is coded in a variable length. The quantized transform coefficient coded in the variable length is output as a bit stream along with other data. The quantized transform coefficient output from quantization means 503 is also fed to inverse quantization means 506 to reconstruct original image signals.

The image signals reconstructed through the inverse quantization means 506 and the inverse DCT means 507 will be employed as a reference picture on the subsequent interframe prediction, and are stored in the frame memory 509 through the adder 508. The interframe prediction is performed to P-picture and B-picture at the motion compensation interframe predictor 510.

The motion compensation interframe predictor 510 first compares the input image signals with the reference pictures stored in the frame memory 509, and performs a motion vector detection to determine a motion vector on every macro block that is obtained from dividing the input image. A prediction mode is determined per macro block on the basis of the result from the motion vector detection. In this process, it is decided whether a process of coding a macro block for P-picture and B-picture is executed preferably in the intra-mode or not.

If the prediction mode for a macro is the intra-mode, then the process of coding the macro block for P-picture and B-picture is also performed in an intra-frame coding process. On the contrary, if the prediction mode for a macro block is not the intra-mode, then the process of coding the macro block for P-picture and B-picture is perfomed by the interframe prediction using the image signals stored in the frame memory 509 as reference images. The motion compensation interframe predictor 510 performs a motion compensation interframe prediction based on the preveously determined motion vector to generate a predicted image signal corresponding to the input image signal.

The predicted image signal generated from the motion compensation interframe predictor 510 is given through the selector 511 to the adder 508 as well as the subtracter 501. The predicted image signal given to the subtracter 501 is herein described. The subtracter 501 computes a difference signal between the input image signal and the given predicted image signal. A coding process subsequently performed to the difference signal is the same as the coding process to I-picture; the difference signal is transformed at the DCT means 502 into a DCT coefficient, then is quantized at the quantization means 503.

The difference signal quantized at the quantization means 503 is fed to the variable length coder 504 to output as a bit stream and is also fed to the inverse quantization means 506. Thereafter, a reconstructing process is performed to the coded difference signal. This reconstructing process, which is performed through the inverse quantization means 506 and the inverse DCT means 507, is similar to the reconstructing process that is performed to the above described P-picture and B-picture. Namely, the reconstructed difference signal is added at the adder 508 with the predicted image signal previously given to the adder 508 to generate a reconstructed image signal.

The predicted image signal generated at the adder 508 is stored in the frame memory 509 as a reference image for use in a subsequent interframe prediction coding process. In the method represented by MPEG-2 (ISO/IEC-13818-2), the process of coding the input moving picture signal is therefore possible to reduce a redundancy in the spatial domain by means of the DCT transform as well as a redundancy in the time domain by means of the interframe prediction. Thus, moving pictures are coded efficiently. In addition, in the method represented by MPEG-2 (ISO/IEC-13818-2), the bit rate controller 505 may also be provided between the variable length coder 504 and the quantization means 503. The bit rate controller 505 acquires information of the generated code quantity from the variable length coder 504, determines a quantization scale so as to satisfy the restriction of the bit rate, and sends the quantization scale data to the quantization means 503, thereby possibly controlling the generated code quantity.

Prior art for performing the coding process of MPEG-2 (ISO/IEC-13818-2) is specifically described below. A first example of the prior art is a method of MPEG-2 Test Model (Test Model 5, ISO/ICE JTC1/SC21/WG11/N0400, April 1993), which is known as a bit rate control method in a coding system with such a quantization process as described above. This system also employs a constant bit rate coding system, wherein the code quantity is made constant per certain unit time. For example, a known system controls a code quantity using a unit of group of pictures (GOP) that is a group of a plurality of pictures to be coded. The system adjusts a quantization scale to be set per macro block that is obtained from dividing a picture into 16×16 pixels in such a manner that a code quantity generated by the coding process on each GOP becomes constant.

The first example of the prior art employs the constant bit rate coding system. Therefore, in such a scene that a larger quantity of code is to be generated, it reduces the generated code quantity by increasing the quantization scale. To the contrary, in such a scene that a smaller quantity of code is to be generated, it increases the generated code quantity by reducing the quantization scale. The first example of the prior art, however, sets the quantization scale so as to control the code quantity per unit time to be constant. In particular, in a coding process for the scene that requires a larger quantity of code, it increases the quantization scale and reduces the generated code quantity, thereby causing a disadvantage that it degrades an image quality.

To replace the constant bit rate coding method of the above first example, a variable bit rate coding system is also proposed. In an example of the variable bit rate coding system, when a coded image is stored into a storage medium that has a limited total code quantity to be stored under the limited quantity of the total codes, the bit rate is controlled on the basis of code quantity required for maintaining or improving average image quality.

JP 6-141298A (1994) discloses a second example of the prior art, which employs the variable bit rate coding system. The second example of the prior art first sets a standard quantization scale previously, then quantizes a DCT coefficient based on the standard quantization scale, and executes a real coding process for actually coding, through a preparatory coding process for computing a code quantity to be generated. Namely, it is a "two-pass coding" system, which executes the real coding process after finishing the whole preparatory coding process, and is possible to achieve a high quality image coding because it performs re-coding after knowing the characteristic of the whole contents.

The second example of the prior art is, however, required to execute twice processes, or the preparatory and real coding processes, during coding certain video contents, which consume at least double time period, thereby causing a disadvantage that it can not perform a real time process. To the contrary, in order to execute the variable bit rate coding in real time, a "one-pass coding" system is also disclosed. The "one-pass coding" system does not employ the preparatory coding process.

A "MPEG2 real time variable bit rate coding system using quantization steps" (Inada et al., the Institute of Electronics, Information and Communication Engineering (IEICE), Information and System society meeting paper, 2D 11-3 (P3), March 1998) is known as a third example of the prior art that employs the "one-pass coding" system in the variable bit rate coding system. The third example of the prior art performs an image coding process on the basis of MPEG-2, and sets after a certain time period a quantization scale per GOP to adjust a generated code quantity so as to be a predetermined average bit rate.

JP 10-164577A (1998) discloses a fourth example of the prior art. The fourth example of the prior art updates a code quantity that can be assigned to the subsequent several GOPs based on an actually generated code quantity. Then, it determines code quantity or quantization scale, comparing the average picture complexity up to present with the present picture complexity.

The above third and fourth examples suppress larger variations in the quantization scale, and assign the code quantity from a lower complexity scene that needs less codes to a higher complexity scene that needs much codes as a result of setting the quantization scale. Thus, the average image quality can be improved relative to the constant bit rate control system under the same average bit rate.

The above described one-pass variable bit rate coding system, however, has a disadvantage that a sequence of coding processes may possibly invite an image quality degradation. The one-pass variable bit rate coding system first computes an assignable code quantity or target rate and computes code quantity or quantization scale. Therefore, priority is given to the bit rate control within a certain time period. Accordingly, the quantization scale depending on the scene is not sufficiently assigned. As a result, the coded image quality does not become different greatly from that coded by the constant bit rate.

In addition, even in the case of an image that generates fewer codes and can be easily coded, if its code quantity is not enough for the average bit rate, the system intends to decrease the qauntization width and increase the generated code quantity. Therefore, the assigned code quantity is increased excessively even though a sufficient image quality is obtained and the codes may be consumed uselessly. As a result, a sufficient code quantity may not be assigned in such a scene that generates many codes.

Further, in the lower complexity scene, a more degraded image may possibly be detected compared to the constant bit rate coding at the same average bit rate. The reason lies in that the code quantity for low complexity scene is reduced excessively, when the coding process is limited merely to suppressing great fluctuation in the quantization scale.

SUMMARY OF THE INVENTION

An object of the present invention is to provide a variable bit rate coding method and apparatus capable of executing a variable bit rate coding in real time. It is also capable of coding with a higher image quality than that of the conventional one-pass variable bit rate coding method that also performs the variable bit rate coding in real time.

In the moving picture coding method of the present invention, input moving picture data is coded with a given quantization scale at the moving picture coding step.

Then, a complexity is computed per a first image unit from the quantization scale and the generated code quantity.

Then, an average complexity of images coded from the beginning of coding up to now is calculated on the basis of the quantization scale and the generated code quantity; selecting a smaller complexity from the complexity per the first image unit and the average complexity and computing a quantization scale of the first image unit from the average bit rate.

Then, the quantization scale is adjusted per a second image unit on the basis of the generated code quantity and an excess or shortage quantity relative to the predetermined average bit rate.

In the above-explained average complexity computing step, the average complexity may be computed on the basis of of the complexity per the first image unit.

Further, in the moving picture coding method of the present invention, the moving picture coding means codes input moving picture data with a given quantization scale and outputs the generated code quantity to the first image complexity computing means.

The first image complexity computing means computes a complexity per a first image unit on the basis of the quantization scale and the generated code quantity.

The average complexity computing means computes an average complexity of images coded from the beginning of coding up to now on the basis of the quantization scale and the generated code quantity.

The quantization scale computing means selects the smaller complexity from the complexity per the first image unit and the average complexity and computes a quantization scale of the first image unit on the basis of the predetermined average bit rate.

The quantization scale adjusting means adjusts the quantization scale per a second image unit on the basis of the quantization scale and the generated code quantity in accordance with an excess or shortage quantity relative to the predetermined average bit rate and provides it to the moving picture coding means.

In the above-explained method of the present invention, the average complexity computing means may compute an average complexity of images coded from the beginning of coding up to now on the basis of the complexity per the first image unit;

According to the present invention, it is possible to execute a variable bit rate coding in real time and achieve a high image quality coding.

PREFERRED EMBODIMENT OF THE INVENTION

Preferred embodiments of a variable bit rate moving picture coding method and apparatus according to the present invention will be described in detail below with reference to the drawings.

Figure 1:
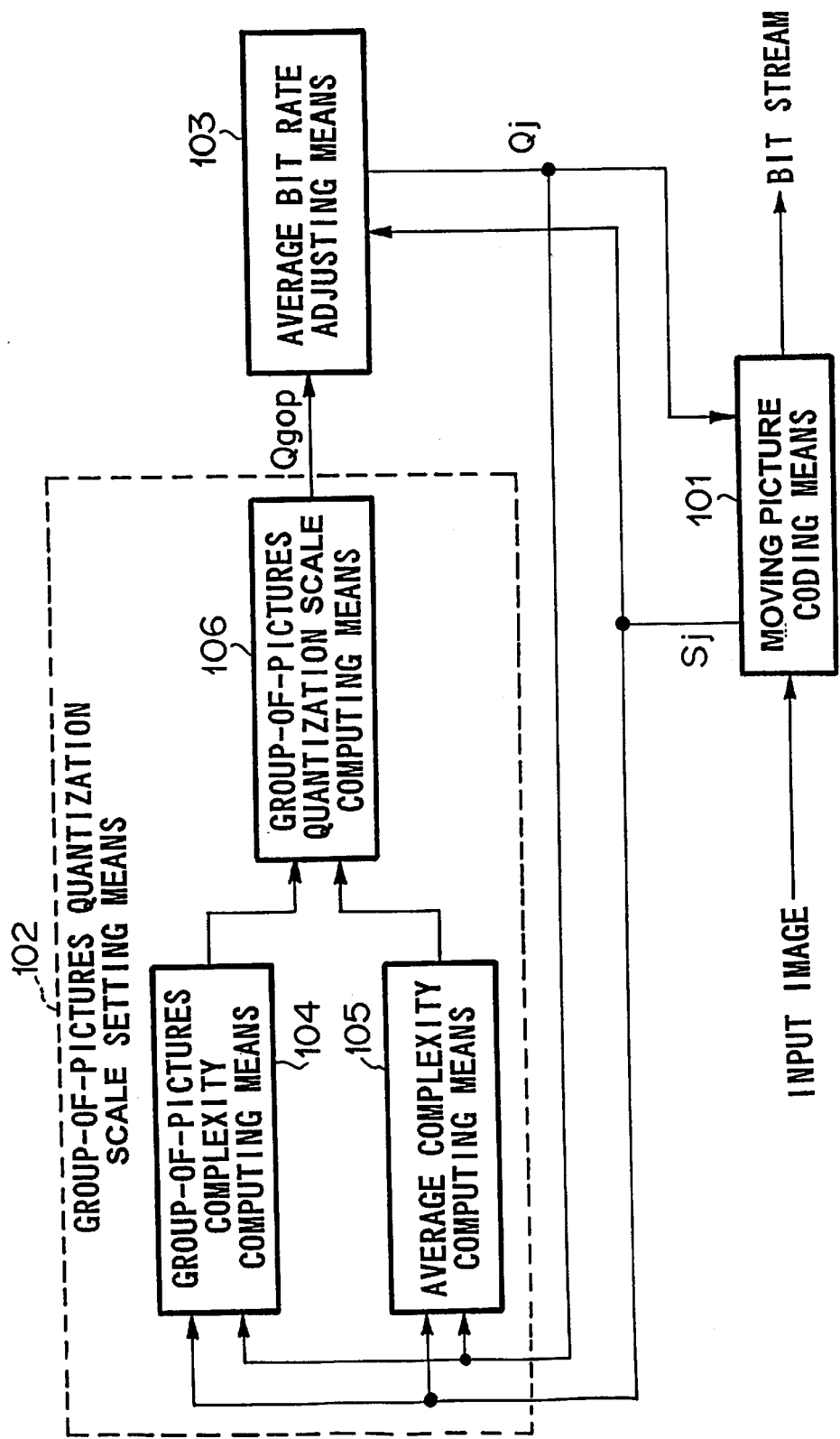
FIG. 1 is a block diagram showing an arrangement example of a first embodiment of a variable bit rate moving picture coding method according to the present invention.

FIG. 1 is a block diagram illustrating a first embodiment of a variable bit rate moving picture coding method of the present invention. MPEG-2 (ISO/ICE-13818) system is employed as a coding system in the present invention. The coding system is, however, not limited in MPEG-2 (ISO/ICE-13818) system. Rather, any coding technology can be employed so long as its code quantity is controlled by a quantization scale along with a scalar quantization process. For example, MPEG-1 (ISO/IEC-11172), ITU-T .261 and ITU-T H.263 may also be employed.

The quantization scale given to the moving picture coding means is a given value as a standard for bit rate control. Therefore, it does not prevent an adaptive quantization corresponding to a local position within a picture. Accordingly, a finally given adaptive quantization scale may be different from the quantization scale given to the moving picture coding means as the standard for bit rate control. Any way, in the present invention, the first image coding unit is a group of pictures (GOP) that is defined in MPEG.

In addition, the second image coding unit is a macro block, or a slice in a picture in the GOP. The macro block is the smallest unit for setting up the quantization scale. The unit of this coding process is not limited in one herein described. The first image coding unit and the second image coding unit are not limited in these systems so long as they can be set as a unit for generally controlling an image quality within a certain time period and a smaller unit for more finely correcting the value set in the general unit. For example, the first image coding unit may comprise a plurality of GOPs. The second image coding unit may also comprise a plurality of macro blocks, which includes a group of macro blocks that are laterally arrayed in a row on a picture, a slice as defined in MPEG-1 and MPEG-2, and a GOB (Group of Blocks) as defined in H.261.

An arrangement example of the first embodiment of the variable bit rate moving picture coding method according to the present invention shown in FIG. 1 is herein described. In the first embodiment shown in FIG. 1, the method comprises a moving picture coding means 101, GOP quantization scale setting means 102, and average bit rate adjusting means 103 that is used as a quantization scale adjusting means. Moving picture coding means 101 herein performs a coding process for input image data or moving picture data based on quantization scale Qj, given per macro block and outputs generated code quantity, Sj, in this coding process.

Quantization scale Qj given to the moving picture coding means 101 is also given to GOP quantization scale setting means 102. GOP quantization scale setting means 102 sets quantization scale Qgop, of GOP on the basis of given quantization scale Qj and code quantity Sj, which is generated in the coding process from quantization scale Qj, which is given to the moving picture coding means 101. GOP quantization scale setting means 102 herein includes a group of pictures (GOP) complexity computing means 104, average complexity computing means 105 and GOP quantization scale computing means 106.

GOP complexity computing means 104 and average complexity computing means 105, which configure a first complexity computing means, respectively compute a GOP complexity and an average complexity on the basis of quantization scale Qj and generated code quantity Sj given to GOP quantization scale setting means 102, and output them. GOP quantization scale computing means 106 computes the quantization scale Qgop, from the above GOP complexity and average complexity.

Code quantity Sj given to GOP quantization scale setting means 102 is also given to the average bit rate adjusting means 103. Average bit rate adjusting means 103 compares given code quantity Sj with the average bit rate, and from this comparison, obtains an excess or shortage quantity of the actually generated code quantity Sj relative to the average bit rate. It further adjusts the quantization scale Qgop from GOP quantization scale setting means 102 in accordance with the above excess or shortage, and determines the quantization scale Qj given to the moving picture coding means 101.

Figure 2:
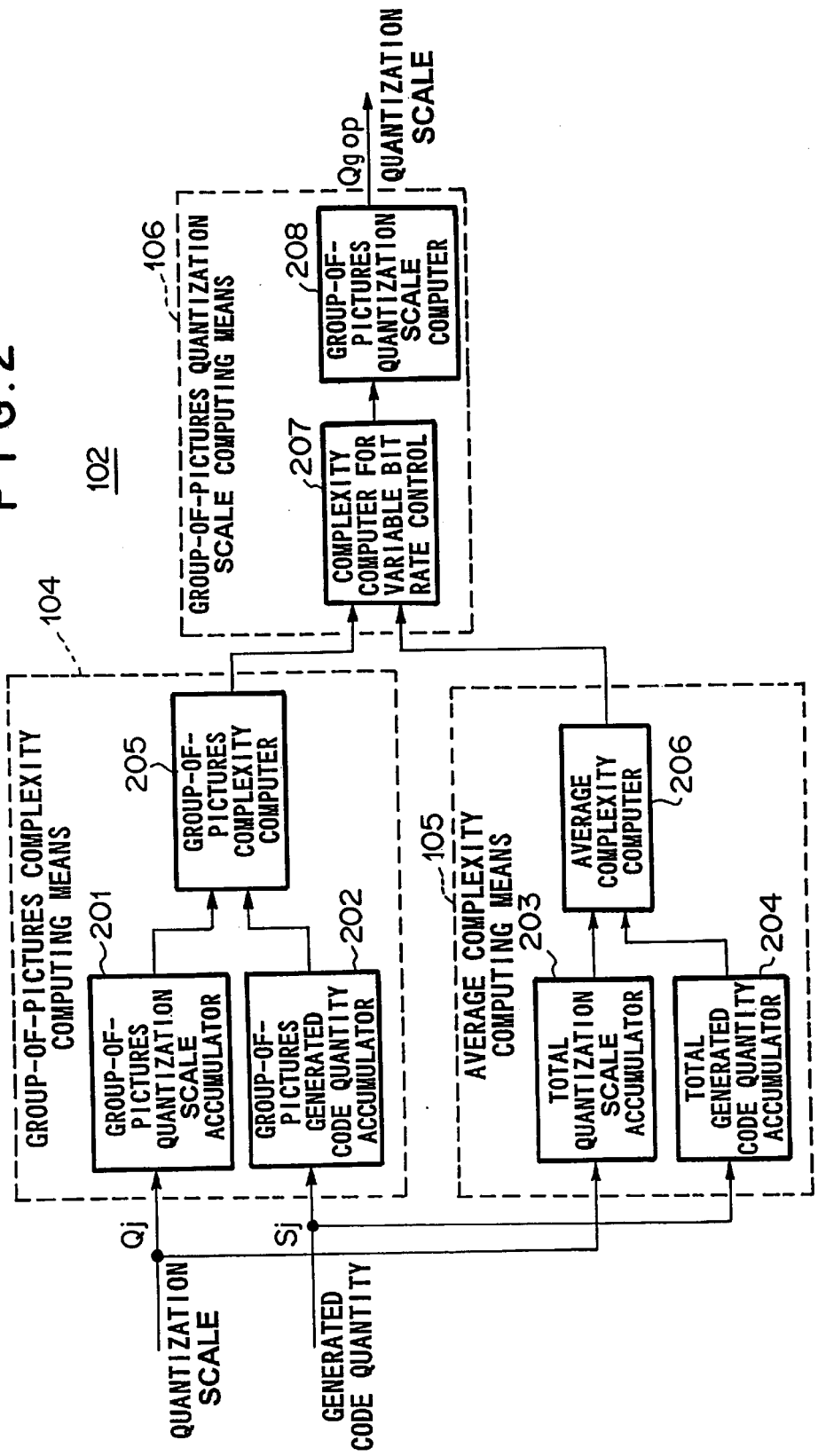
FIG. 2 is a block diagram showing an inner detailed arrangement example of a GOP quantization scale setting means in the variable bit rate moving picture coding method of FIG. 1.

FIG. 2 is a block diagram for explaining GOP quantization scale setting means 102 in FIG. 1 in detail, showing a detailed inner arrangement thereof. In FIG. 2, the GOP quantization scale setting means 102 includes GOP complexity computing means 104, average complexity computing means 105 and GOP quantization scale computing means 106, as similarly shown in FIG. 1. Further, GOP complexity computing means 104 comprises GOP quantization scale accumulator 201, GOP generated code quantity accumulator 202 and GOP complexity computer 205.

Further, average complexity computing means 105 comprises total quantization scale accumulator 203, total generated code quantity accumulator 204 and average complexity computer 206.

Further, GOP quantization scale computing means 106 comprises complexity computer 207 for variable bit rate control and GOP quantization scale computer 208.

In GOP complexity computing means 104, GOP quantization scale accumulator 201 accumulates, during one GOP, quantization scale Qj which is given from average bit rate adjusting means 103 to GOP quantization scale setting means 102. GOP generated code quantity accumulator 202 accumulates, during one GOP, generated code quantity, Sj which is given from moving picture coding means 101 to GOP quantization scale setting means 102.

In the average complexity computing means 105, the total quantization scale accumulator 203 accumulates the quantization scale, Qj, which is given from the average bit rate adjusting means 103 to GOP quantization scale setting means 102, over the whole time period from the beginning of the coding process up to now. Total generated code quantity accumulator 204 accumulates the generated code quantity Sj which is given from moving picture coding means 101 to GOP quantization scale setting means 102, over the whole time period from the beginning of the coding process up to now.

In GOP complexity computing means 104, GOP complexity computer 205 computes a complexity per GOP on the basis of an average value of quantization scale Qj obtained from the quantization widths accumulated in GOP quantization scale accumulator 201 and an accumulated value of GOP generated code quantity Sj accumulated in GOP generated code quantity accumulator 202. The average value of qauntization width Qj is one that is obtained on the basis of the accumulated w value of quantization width Qj given from GOP quantization scale accumulator 201 and the number of quantization width Qj per GOP given from average bit rate adjusting means 103. In addition, the accumulated value of GOP generated code quantity Sj is an accumulated value of generated code quantity Sj per GOP generated at moving picture coding means 101 on the basis of quantization width Qj given per macro block from average bit rate adjusting means 103.

The average complexity computer 206 computes an average complexity on the basis of an average value of quantization width Qj accumulated in total quantization width accumulator 203 and an accumulated value of total generated code quantity Sj accumulated in total generated code quantity accumulator 204. The average value of quantization width Qj is one that is obtained on the basis of the accumulated value of quantization width Qj given from total quantization width accumulator 203 and number of the quantization width Qj given from the average bit rate adjusting means 103. The accumulated value of total generated code quantity Si is an accumulated value of whole generated code quantity Sj generated in moving picture coding means 101 in accordance with quantization scale Qj per macro block given from average bit rate adjusting means 103.

In GOP quantization scale computing means 106, complexity computer 207 for variable bit rate computes a complexity for use in quantization scale computation on the basis of the GOP complexity output from GOP complexity computer 205 and the average complexity output from average complexity computer 206. The GOP complexity and the average complexity are herein compared with each other in their magnitudes and a smaller one thereof is outputted as the complexity for variable bit rate. GOP quantization scale computer 208 computes a standard quantization scale Qgop, per GOP on the basis of the complexity given from complexity computer 207 for variable bit rate, and the average bit rate.

Figure 3:
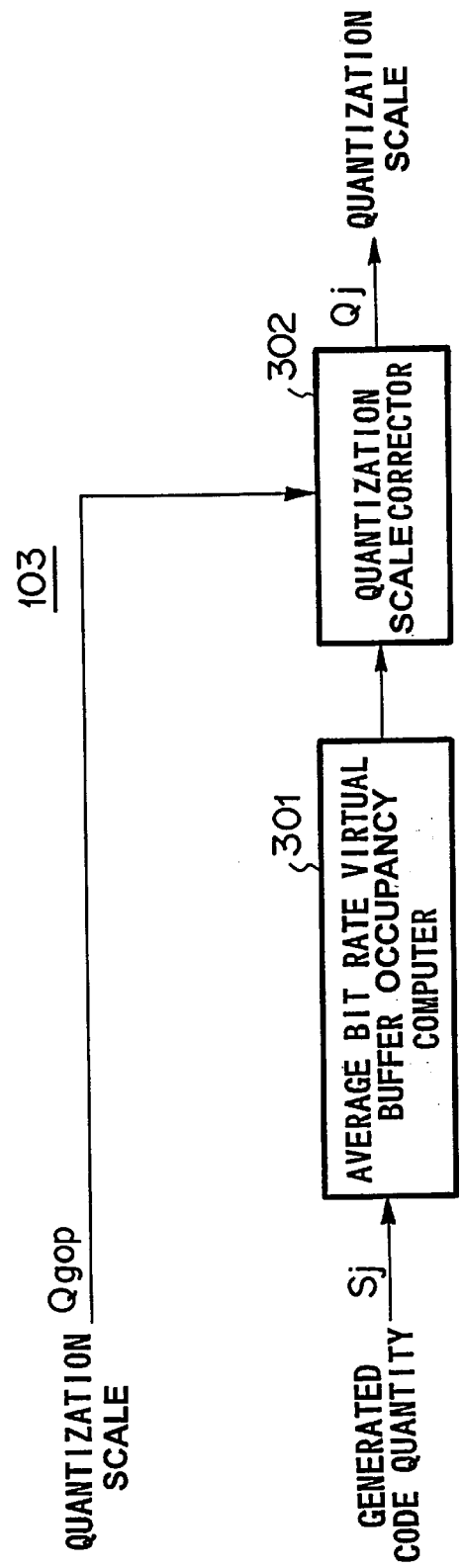
FIG. 3 is a block diagram showing an inner detailed arrangement example of an average bit rate adjusting means in the variable bit rate moving picture coding method of FIG. 1.

FIG. 3 is a block diagram for explaining the average bit rate adjusting means 103 in FIG. 1 in detail, showing a detailed inner arrangement thereof. As shown in FIG. 3, the average bit rate adjusting means 103 comprises an average bit rate virtual buffer occupancy computer 301 and a quantization scale corrector 302. The average bit rate virtual buffer occupancy computer 301 computes a buffer occupancy in an average rate virtual buffer on the basis of the generated code quantity Sj per GOP given from the moving picture coding means 101 and the average bit rate. In accordance with the buffer occupancy in the average rate virtual buffer computed at the average bit rate virtual buffer occupancy computer 301, the quantization scale corrector 302 corrects the quantization scale Qgop given from the GOP complexity computer 206 of the GOP quantization scale computing means 106 in the GOP quantization scale setting means 102. Then it sends out the corrected quantization scale Qgop as the quantization scale Qj to the moving picture coding means 101 and the GOP quantization scale setting means 102.

Figure 4:
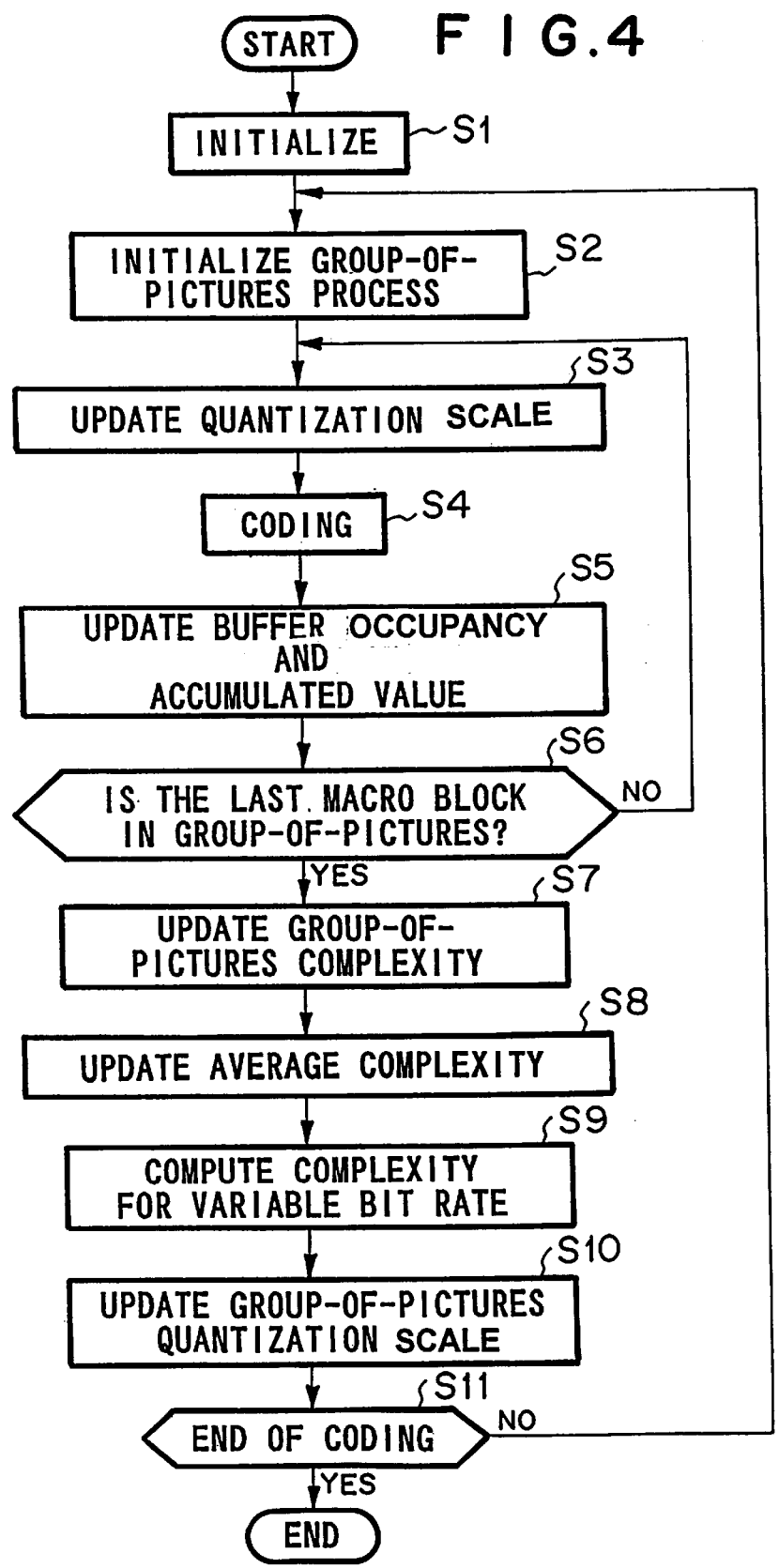
FIG. 4 is a flowchart showing an operational example of the variable bit rate moving picture coding method and apparatus according to the present invention.

Operations of the first embodiment of the present invention is described, referring to FIG. 4. First of all, an initialization is executed at step Sl. Concretely, an initial value is set up for the quantization scale Qgop, of GOP outputted from the GOP quantization scale setting means 102.

In this case, the initial value of the quantization scale Qinit should be decided beforehand. Then, the quantization scale Qgop is initialized on the basis of the initial value Qinit. The initialized quantization scale Qgop is outputted from the GOP quantization scale setting means 102. Therefore, Qgop=Qinit Next, a re-set procedure is executed for accumulators, various counters and a buffer occupancy. Here, "0" (zero) is set up for Qsum and Ssum. Here, Qsum is an accumulated value of the quantization scale Qgop, while Ssum is an acumulate value of the generated code quantity Sj. The counter j which indicates macro block number and counter Ngop which indicates GOP number are re-set. The virtual buffer occupancy "vboc" which indicates the average virtual buffer occupancy is also re-set. Therefore, Qsum=0
Ssum=0
j=0
Ngop=0
vboc=0

Then, another reset is executed for accumulators at a GOP initializing process (step S2), prior to the beginning of a GOP processing step. Here, the reset is executed for both an accumulated value Qsum.gop of the quantization scale per GOP and an accumulated value Ssum.gop of the generated code quantity Sj per GOP. Counter k which indicates macro block number per GOP is also set up to be zero. Therefore, Qsum.gop=0
Ssum.gop=0
k=0

Next, at a quantization scale updating process (step S3), the average bit rate adjusting means 103 updates quantization scale Qgop given from the GOP quantization scale setting means 102. This operation is to modify Qgop, on the basis of the virtual buffer occupancy "vboc" which is obtained on the basis of both the average bit rate and the code quantity Sj. Here, code quantity Sj is obtained by the moving picture coding means 101.

For example, on the basis of the standard quantization scale Qgop to be set in the GOP quantization scale setting means 102 before updating and the virtual buffer occupancy "vboc", before updating, setting the quantization scale Qj to be corrected at and output from the average bit rate adjusting means 103 as follows:

$$Qj=Qgop\times(1+vboc/Qreact)$$

where Qreact denotes a parameter for determining a magnitude of a reaction of control at an excess or shortage quantity of the generated code quantity Sj relative to the average bit rate.

Then, at a coding process (step S4), the moving picture coding means 101 performs a coding process for a macro block on the basis of the quantization scale Qj output from the average bit rate adjusting means 103. After finishing the coding process for one macro block, updating the virtual buffer occupancy "vboc", at a buffer occupancy and accumulated value updating process (step S5). At the same time, updating the accumulated values of Qsum and Qsum.gop, which are set at the GOP quantization scale setting means 102, and also updating the accumulated values of Ssum and Ssum.gop.

When updating the virtual buffer occupancy "vboc", the generated code quantity Sj generated in the coding process for the j-th macro block is added to the virtual buffer occupancy "vboc", and an average bit rate per macro block "Rave_mb" is subtracted from the result of the addition. In addition, Qsum.gop, Ssum.gop, Qsum, and Ssum are renewed. Here, Qsum.gop is outputted from GOP quantization scale means 102. Ssum.gop is outputted from GOP generated code quantity accumulator 202. Qsum is outputted from total accumulator 203. Ssum is outputted from total generated code quantity accumulator 204. Further, the counters, j and k, for the number of macro blocks are incremented. Therefore, vboc=vboc+Sj-Rave_mb
Qsum.gop=Qsum.gop+Qj
Ssum.gop=Ssum.gop+Sj
k=k+1
Qsum=Qsum+Qj
Ssum=Ssum+Sj
j=j+1

As obvious from the above computations, the virtual buffer occupancy indicates an excess or shortage of the actually generated code quantity relative to the average bit rate.

Further, at a termination of GOP decision process (step S6), it is inspected whether a macro block to be coded is the final macro block in the GOP. In this inspection, if the macro block is not the final macro block, then step 6 is followed by coding process step S3 for transferring to a process for the next macro block and repeating the coding process.

In the decision at the step S6, if the macro block is the final macro block in the GOP, then a coding process for the next GOP is executed. At the same time, at a GOP complexity updating process (step S7), the GOP complexity computer 205 in the GOP quantization scale setting means 102 computes and updates a new GOP complexity, Xgop. This is computed on the basis of Ssum.gop and Qsum.gop, in the coding process for the previous GOP. Therefore, $$Xgop=Ssum\cdot gop\times(Qsum\cdot gop/k)$$

Next, at an average complexity updating process (step S8), counter Ngop for the number of GOP is incremented. Further, new average complexity Xave is computed on the basis of Ssum and Qsum, up to the coding process for the previous GOP. Xave is updated at the average complexity computer 206 in the GOP quantization scale setting means 102. Therefore, $$Ngop=Ngop+1$$

$$Xave=Ssum\times(Qsum/j)/Ngop$$

Then, at a complexity computing process for variable bit rate control (step S9), a complexity is calculated for use in a computation of Qgop, for the next GOP. At the complexity computer 207 for variable bit rate control in the GOP quantization scale setting means 102, the complexity for variable bit rate control Xvbr is calculated on the basis of the updated GOP complexity Xgop, and the updated average complexity Xave, in accordance with the above equations. Herein, by comparing Xgop with Xave, the smaller one is selected for Xvbr. Therefore, Xvbr=min (Xgop, Xave)

At a GOP quantization scale updating process (step S10), updating Qgop for the next GOP. At the GOP quantization scale computer 208 in the GOP quantization scale setting means 102, quantization scale Qgop is newly calculated to be a ration of complexity Xvbr and average bit rate Rgop per GOP. Therefore, Qgop=Xvbr/Rgop Then, it is inspected whether the coding process for the last macro block in this sequence is finished (step 11). If the coding process for the last macro block in this sequence is finished (YES at step S11), then the coding process is ended for this sequence. On the other hand, if the macro block in the coding process is not the last macro block in this sequence, the coding process for this sequence is not yet finished (NO at step 511). In this case, step 11 is followed by step 2 and the subsequent steps.

Figure 5:
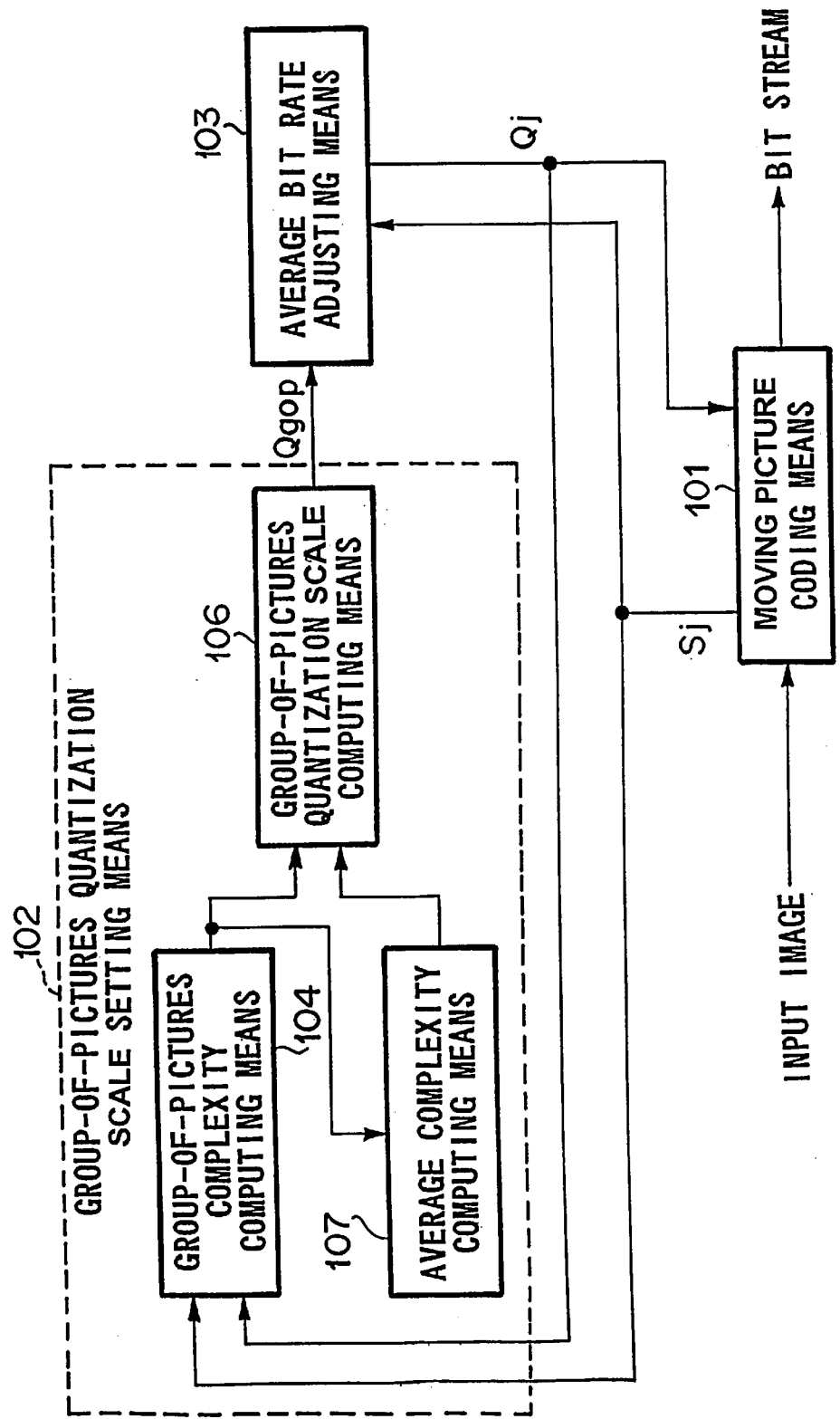
FIG. 5 is a block diagram showing an arrangement example of a second embodiment of a variable bit rate moving picture coding method according to the present invention.

Other embodiments of the present invention is described, referring to FIGS. 5 to 9. FIG. 5 is a block diagram showing an arrangement of a second embodiment of the variable bit rate moving picture coding method according to the present invention. This is also applicable to a second embodiment of the variable bit rate moving picture coding method according to the present invention. The second embodiment according to the present invention shown in FIG. 5 includes a modification to the GOP quantization scale setting means 102 shown in FIG. 1. According to the second embodiment shown FIG. 5, the GOP quantization scale setting means 102 comprises a GOP complexity computing means 104, an average complexity computing means 107 and a GOP quantization scale computing means 106.

The GOP complexity computing means 104 computes and outputs a GOP complexity on the basis of the quantization scale Qj and generated code quantity Sj given to the GOP quantization scale setting means 102. Unlike the first embodiment shown in FIG. 1, the average complexity computing means 107 computes and outputs an average complexity of images coded from the beginning of the coding process up to now on the basis of the GOP complexity output from the GOP complexity computing means 104. The GOP quantization scale computing means 106 computes the quantization scale of GOP, Qgop, from the above GOP complexity and average complexity.

Figure 6:
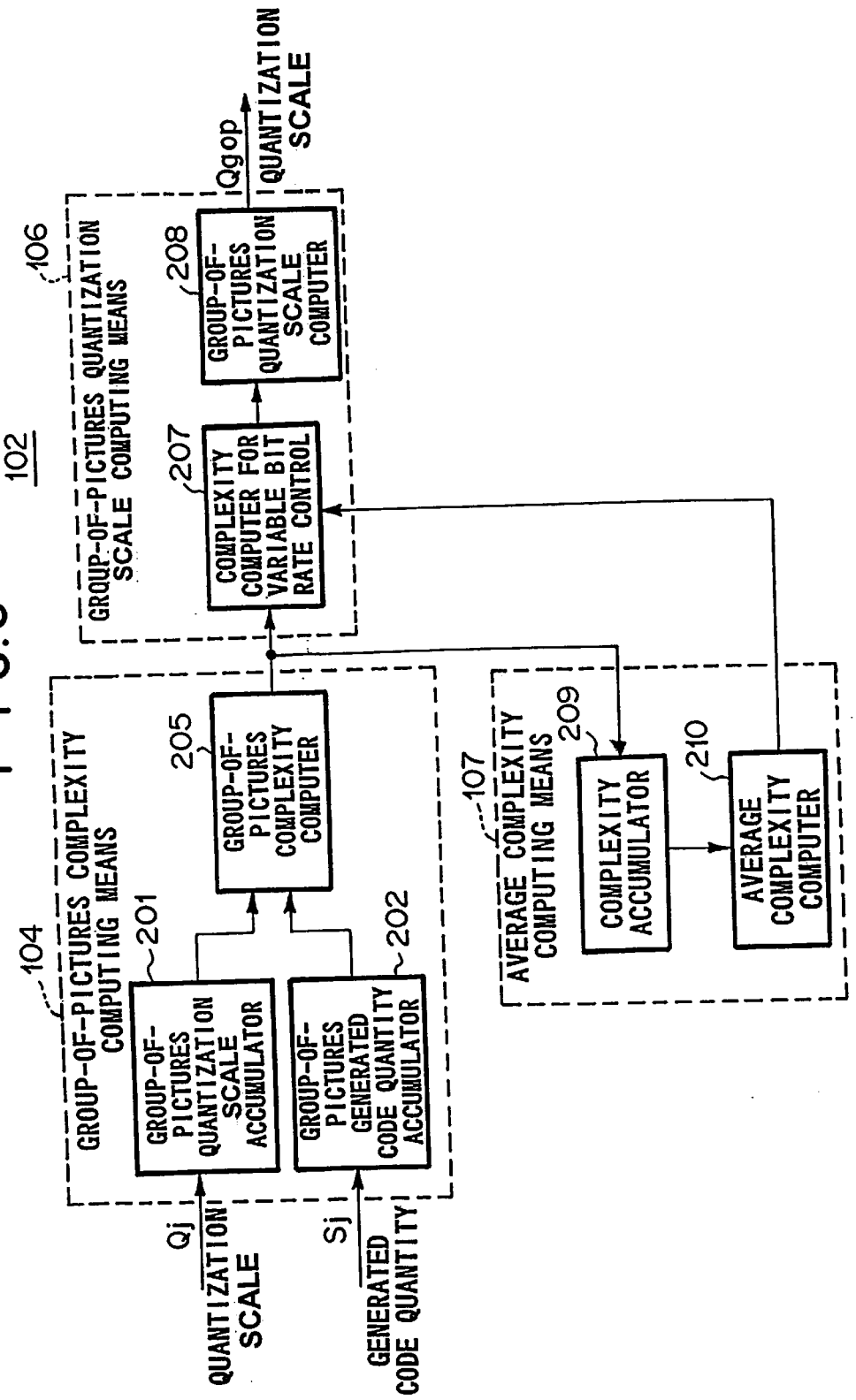
FIG. 6 is a block diagram showing an inner detailed arrangement example of a GOP quantization scale setting means in the variable bit rate moving picture coding method of FIG. 5.

FIG. 6 is a detailed block diagram for explaining the GOP quantization scale setting means 102 as shown in FIG. 5. An average complexity computing means 107 as shown in FIG. 6 has a configuration different from that as shown in FIG. 2. The average complexity computing means 107 comprises a complexity accumulator 209 and an average complexity computer 210.

The complexity accumulator 209 accumulates the GOP complexity output from the GOP complexity computer 205 and records the number of the GOP complexity given from the GOP complexity computer 205. The average complexity computer 210 computes an average value of the GOP complexity of images coded from the beginning of the coding process up to now on the basis of the accumulated value of the GOP complexity output from and the number of the GOP complexity given from the complexity accumulator 209, and outputs it as the average complexity.

The average complexity computing means 107 resets the accumulated complexity value Xsum, (Xsum=0) at the initializing process (step S1). Further, it increments the counter Ngop for the number of GOP at the average complexity updating process (step S8), further, obtains the accumulated value of the complexity Xsum, in the whole sequence up to the coding process for the previous GOP of the GOP complexity by using the complexity accumulator 209 in the GOP quantization scale setting means 102. Further, it computes and updates a new average complexity Xave by using the average complexity computer 210 in the GOP quantization scale setting means 102.

Concretely, the calculation algorithms are:

Ngop=Ngop+1

Xsum=Xsum+Xgop

Xave=Xsum/Ngop

The GOP complexity computing means 104 and GOP quantization scale computing means 106 in FIG. 6 have the same configurations as those in FIG. 2.

Figure 7:
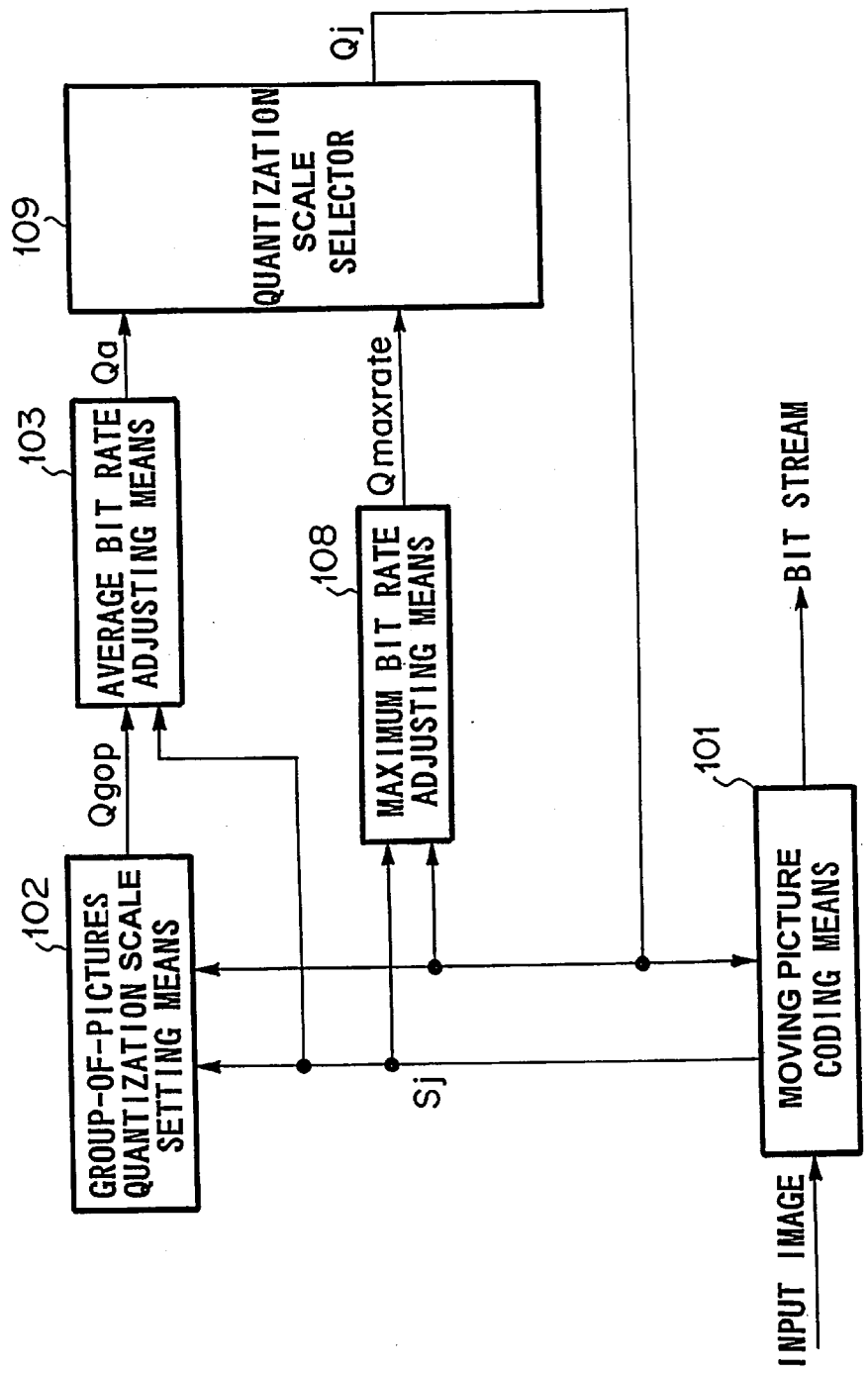
FIG. 7 is a block diagram showing an arrangement example of a third embodiment of a variable bit rate moving picture coding method according to the present invention.

FIG. 7 is a block diagram showing an arrangement of a third embodiment of the variable bit rate moving picture coding method according to the present invention. This is also applicable to a third embodiment of the variable bit rate moving picture coding method according to the present invention. The block diagram shown in FIG. 7 further includes a maximum bit rate adjusting means 108 and a quantization scale selecting means (quantization scale selector) 109 in addition to the block diagram shown in FIG. 1, which illustrates the arrangement of the first embodiment. The maximum bit rate adjusting means 108 outputs the maximum bit rate quantization scale, Qmaxrate, so as not to exceed the designated maximum bit rate on the basis of the generated code quantity, Sj, or the output from the moving picture coding means 101 and the quantization scale of the second image unit, Qj, that is given to the moving picture coding means 101.

A method of setting the maximum bit rate quantization scale, Qmaxrate, at the maximum bit rate adjusting means 108 may be realized by controlling the code quantity at a fixed bit rare under the maximum bit rate and computing the quantization scale per macro block. Test Model 5 can be employed as a system for controlling the code quantity at the fixed bit rare, for example. The quantization scale selecting means 109 compares the quantization scale, Qa, which is set at the average bit rate adjusting means 103, with the maximum bit rate quantization scale, Qmaxrate, which is set at the maximum bit rate adjusting means 108, then selecting a larger one, and outputting it as the quantization scale of the second image unit, Qj.

Figure 8:
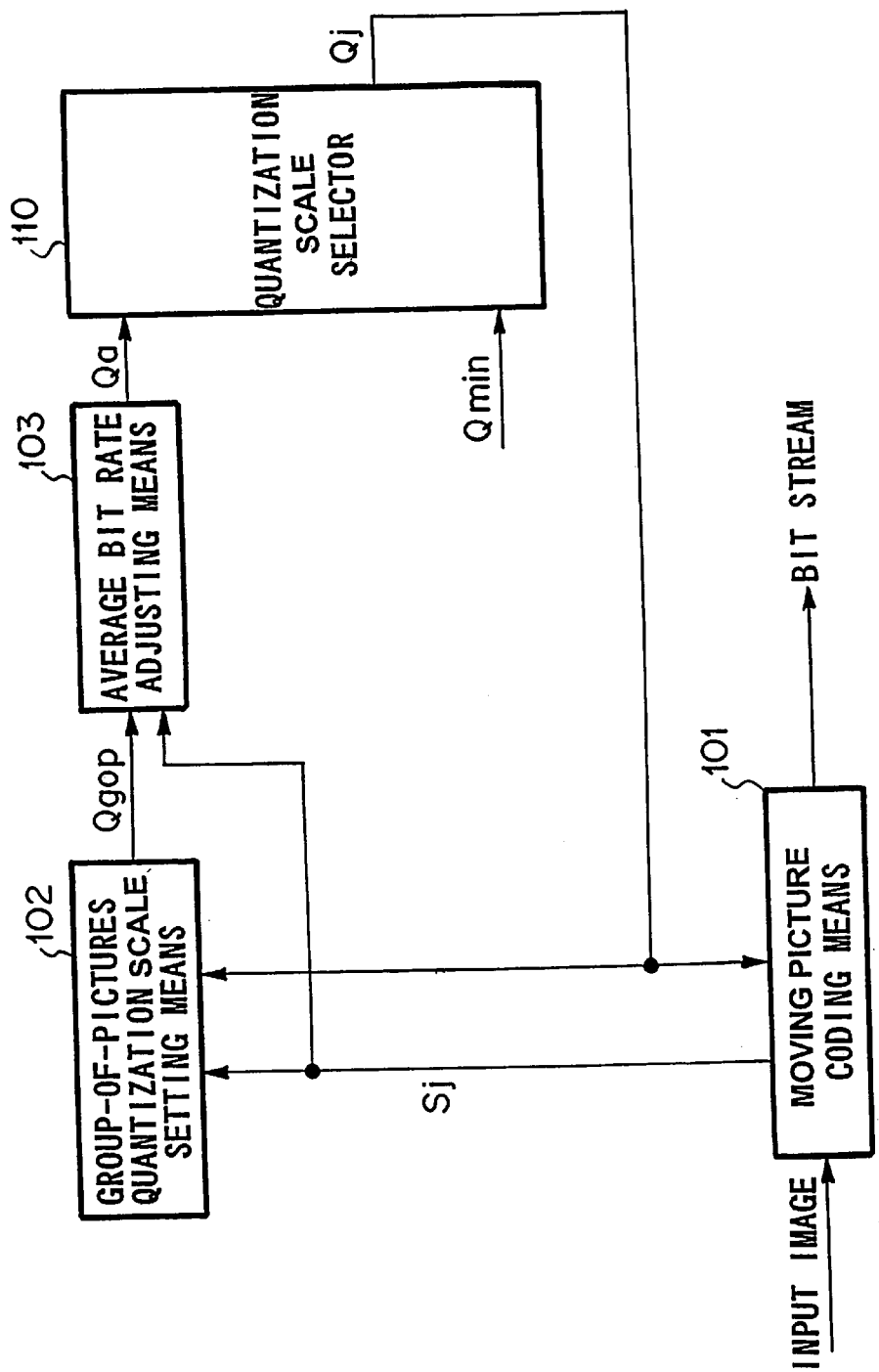
FIG. 8 is a block diagram showing an arrangement example of a fourth embodiment of a variable bit rate moving picture coding method according to the present invention.

FIG. 8 is a block diagram showing an arrangement of a fourth embodiment of the variable bit rate moving picture coding method according to the present invention. This is also applicable to a fourth embodiment of the variable bit rate moving picture coding method according to the present invention. The block diagram shown in FIG. 8 further includes a quantization scale selecting means 110 in addition to the block diagram shown in FIG. 1. The quantization scale selecting means 110 compares the minimum value of the quantization scale, Qmin, which is previously set, with the quantization scale, Qa, which is set at the average bit rate adjusting means 103, then selecting a larger one, and outputting it as the quantization scale of the second image unit, Qj.

Figure 9:
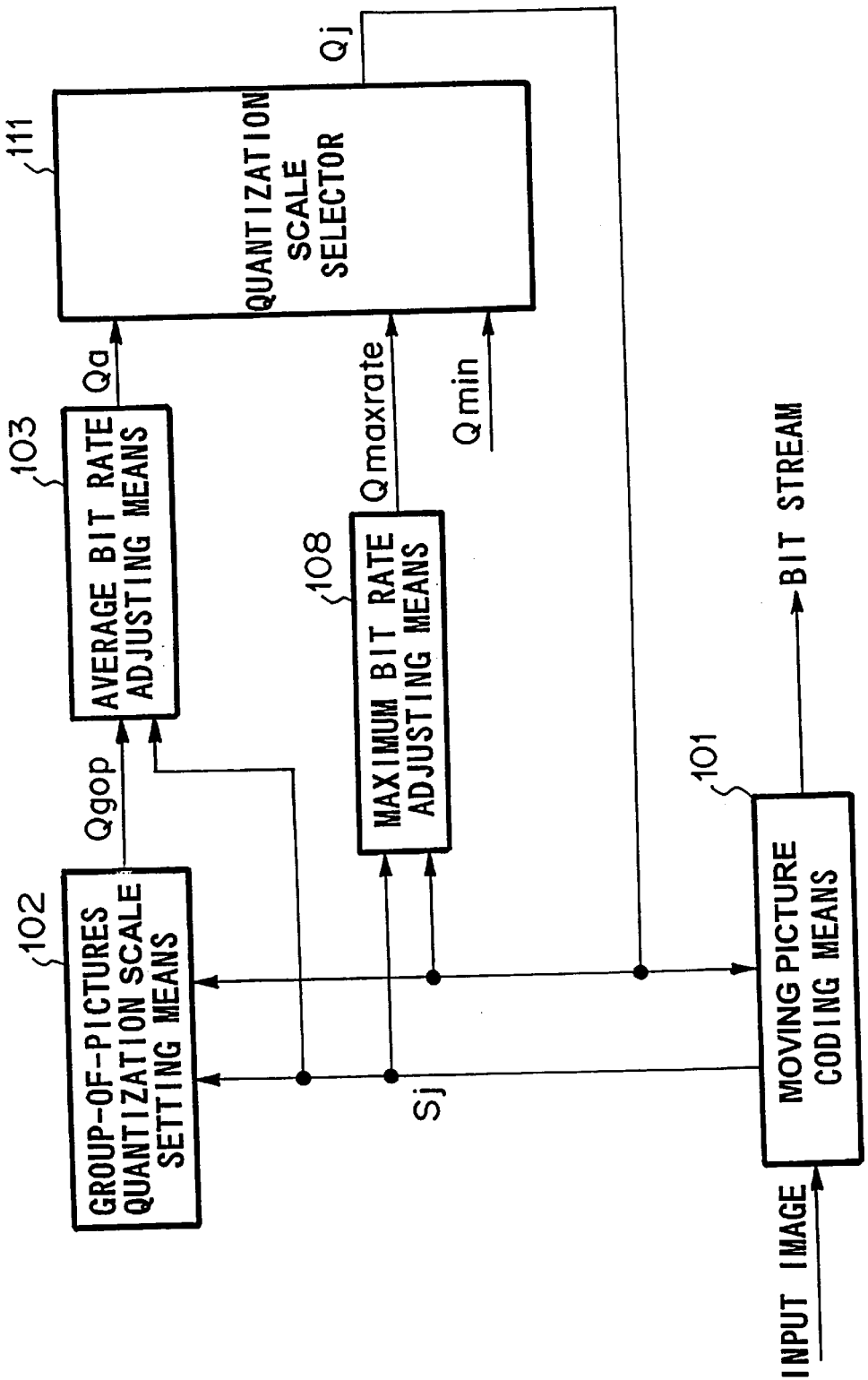
FIG. 9 is a block diagram showing an arrangement example of a fifth embodiment of a variable bit rate moving picture coding method according to the present invention.
Figure 10:
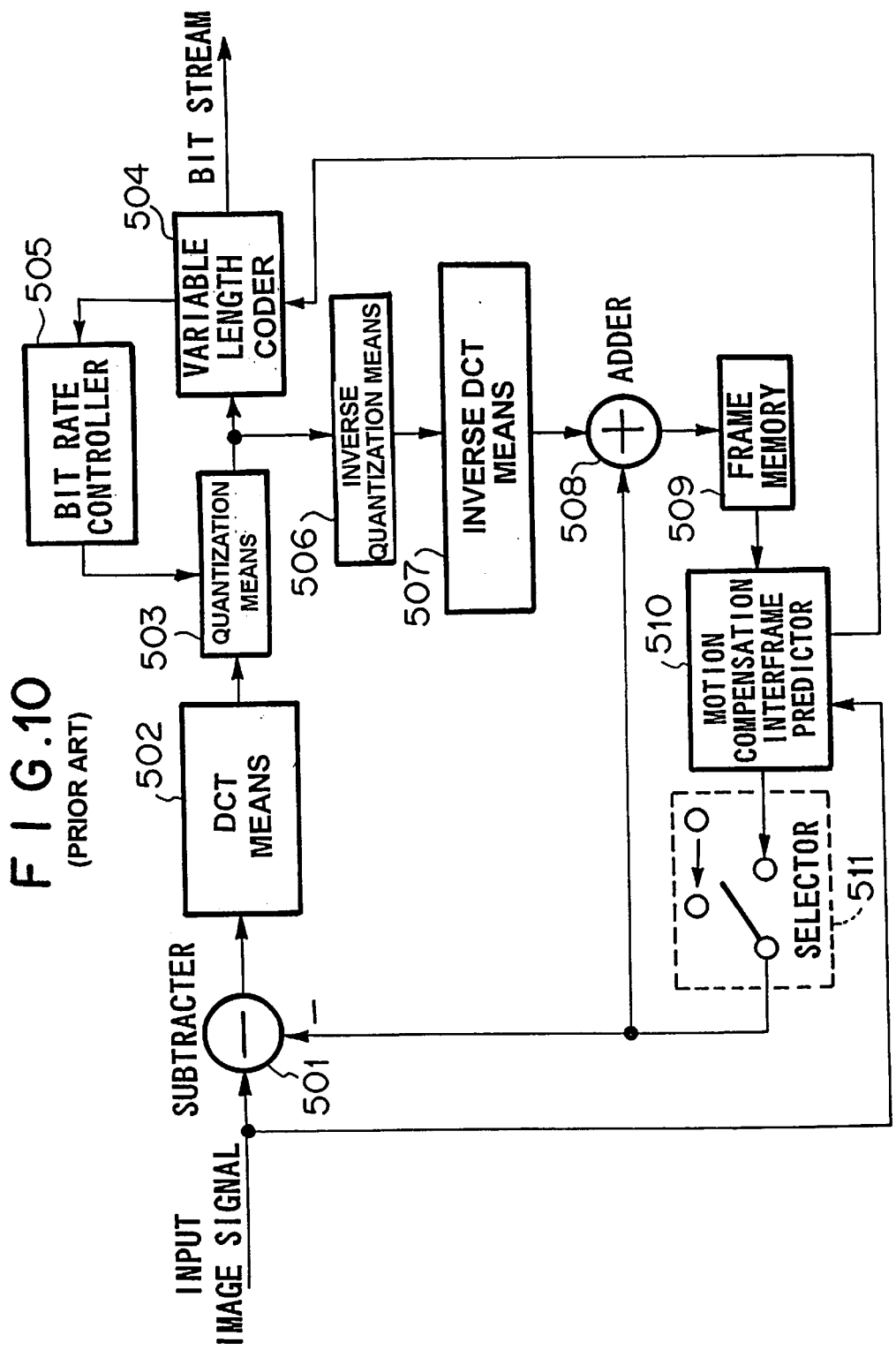
FIG. 10 is a block diagram showing an arrangement of a moving picture coding method for explaining a moving picture coding method on the basis of MPEG-2 in the art.

FIG. 9 is a block diagram showing an arrangement of a fifth embodiment of the variable bit rate moving picture coding method according to the present invention. This is also applicable to a fifth embodiment of the variable bit rate moving picture coding method according to the present invention. The block diagram shown in FIG. 9 includes the arrangement shown in FIG. 7 that illustrates the arrangement of the third embodiment, and additionally includes the setting of the maximum bit rate of the quantization scale Qmin shown in FIG. 8 that illustrates the arrangement of the fourth embodiment. Namely, a quantization scale adjusting means 111 in FIG. 9 compares the quantization scale Qa set at the average bit rate adjusting means 103, the maximum bit rate quantization scale Qmaxrate set at the maximum bit rate adjusting means 108, and the previously set minimum value of the quantization scale, Qmin, with each other, then selecting the largest one, and outputting it to the moving picture coding means 101 as the quantization scale of the second image unit, Qj.

A sixth embodiment according to the present invention can be configured, although it is not illustrated in the drawings, to include such a means for adjusting the quantization scale output from the average bit rate adjusting means 103 as a maximum excessive code quantity, Dmax, from the average bit rate of the virtual buffer occupancy "vboc", which is set to control the quantization scale. For example, with respect to a parameter, Qreact, which is employed in correction of the quantization scale with the virtual buffer occupation quantity, vboc, it can be determined by subtracting the virtual buffer occupancy "vboc", from the maximum excessive code quantity, Dmax, to compute an available code quantity, (Dmax−vboc). Then selecting the smaller one between, Qreact, and, Dmax−vboc, as the parameter Qreact; Qreact=min (Qreact, Dmax−vboc).

In stead of using the parameter qreact, Qj may be used, where $Qj=Qgop\times(1+vboc/(Dmax-vboc))$; or $Qj=Qgop\times(Dmax/(Dmax-vboc))$

What is claimed is:

1. A moving picture coding method, which comprises the steps of:
 a moving picture coding step for coding moving picture data by using a quantization scale (QS) and for outputting coded data and code quantity of said moving picture;
 a complexity computing step for computing complexity per a first image unit on the basis of said QS and said code quantity;
 an average complexity computing step for computing an average complexity of said coded entire moving picture data for the time period from the beginning to the present on the basis of said QS and said code quantity;
 a QS computing step for comparing said complexity per a first image unit with said average complexity of said coded entire moving picture data and for selecting the smaller complexity and for computing newly a QS per a first image unit on the basis of the selected complexity and a prescribed average bit rate; and
 a QS adjusting step for adjusting the newly computed QS every second image unit on the basis of said code quantity and an excess or shortage quantity relative to said prescribed average bit rate.

2. The moving picture coding method according to claim 1, wherein said first image unit is a group of pictures (GOP).

3. The moving picture coding method according to claim 1, wherein said second image unit is either of a macro-block, or a slice in a picture in a group of pictures (GOP).

4. The moving picture coding method according to claim 1 wherein, said complexity computing step, said complexity for said first image unit is defined as an average QS concerning the data coded immediately before the present multiplied by said code quantity of said data coded per unit time immediately before the present.

5. The moving picture coding method according to claim 1, wherein, in said average complexity computing step, said average complexity is defined as an average QS concerning the data coded from the beginning up to the present multiplied by said coded quantity of said data per unit time coded from the beginning to the present.

6. The moving picture coding method according to claim 1, wherein, in said QS computing step, said newly computed QS is calculated per a first image unit, on the basis of ratio of said selected complexity to said prescribed average bit rate.

7. The moving picture coding method according to claim 1, wherein, in said QS adjusted step:
 a maximum excess code quantity over said prescribed average bit rate is set up;
 a buffer of which size is said maximum excess is set up;
 data is outputted as said average bit rate from said buffer so that the buffer occupancy indicates an excess quantity over the average bit rate;
 available code quantity which is the difference between said maximum excess code quantity and the buffer occupancy of said buffer is calculated; and
 said newly computed QS is adjusted on the basis of available code quantity in said buffer so that said excess quantity does not exceed said maximum excess code quantity.

8. The moving picture coding method according to claim 1,
 wherein, in said QS adjusting step:
 a maximum bit rate is set up;
 another QS is newly defined as a QS by which said moving picture coding step generates code quantity so as not to exceed said maximum bit rate; and
 a larger one of either said another QS or the adjusted QS is sent to said moving picture coding step.

9. The moving picture coding method according to claim 8, wherein said QS is set up as the case of constant bit rate coding at said maximum bit rate.

10. The moving picture according to claim 1, wherein, in said QS adjusting step,
 a minimum QS is set up; and
 a larger one of either said minimum QS or the adjusted QS is sent to said moving picture coding step.

11. A moving picture coding method, which comprises the steps of:
 a moving picture coding step for coding moving picture data by using a quantization scale (QS) and for outputting coded data and code quantity of said moving picture;
 a complexity computing step for computing complexity per a first image unit on the basis of said QS and said code quantity;
 an average complexity computing step for computing an average complexity of said coded entire moving picture data for the time period from the beginning to the present on the basis of said complexity per a first image unit;
 a QS computing step for comparing said complexity per a first image unit with said average complexity of said coded entire moving picture data and for selecting the smaller complexity and for computing newly a QS per a first image unit on the basis of the selected complexity and an prescribed average bit rate; and
 a QS adjusting step for adjusting the newly computed QS every second image unit on the basis of said code quantity and an excess or shortage quantity relative to said prescribed average bit rate.

12. The moving picture coding method according to claim 11, wherein said first image unit is a group of pictures (GOP).

13. The moving picture coding method according to claim 11, wherein said second image unit is either of a macro-block, or a slice in a picture in a group of pictures (GOP).

14. The moving picture coding method according to claim 11, wherein, in said complexity computing step, said complexity for said first image unit is defined as an average QS concerning the data coded immediately before the present multiplied by said code quantity of said data coded per unit time immediately before the present.

15. The moving picture coding method according to claim 11, wherein, in said average complexity computing step, said average complexity is defined as an average QS concerning the data coded from the beginning to the present multiplied by said code quantity of said data per unit time coded from the beginning to the present.

16. The moving picture coding method according to claim 11, wherein, in said QS computing step, said newly computed QS is calculated peer first image unit, on the basis of a ration of said selected complexity to said average bit rate.

17. The moving picture coding method according to claim 11, wherein, in said QS adjusting step:
a maximum excess code quantity over said average bit rate is set up;
a buffer of which size is said maximum excess is set up;
data is outputted at said average bit rate from said buffer so that the buffer occupancy indicates an excess quantity over the average bit rate;
available code quantity which is the difference between said maximum excess code quantity and the occupancy of said buffer is calculated; and
said newly computed QS adjusted on the basis of available code quantity in said buffer so that said excess quantity does not exceed said maximum excess code quantity.

18. The moving picture coding method according to claim 11, wherein, in said QS adjusting step:
a maximum bit rate is set up;
another QS is defined as a QS by which said moving picture coding step generates code quantity so as not to exceed said maximum bit rate; and
a larger one of either said another QS or the adjusted QS is sent to said moving picture coding step.

19. The moving picture coding method according to claim 18, wherein said another QS is set up as the case of constant bit rate coding at said maximum bit rate.

20. The moving picture coding method according to claim 11, wherein, in said QS adjusting step,
a minimum QS set up; and
a larger one of either said minimum QS or the adjusted QS is sent to said moving picture coding step.

21. A moving picture coding apparatus, which comprises:
a moving picture coding means for coding moving picture data by using a quantization scale (QS) and for outputting coded data and code quantity of said moving picture;
a complexity computing means for computing complexity per a first image unit on the basis of said QS and said code quantity;
an average complexity computing means for computing an average complexity of said coded entire moving picture data for the time period from the beginning to the present on the basis of said QS and said code quantity;
a QS computing means for computing said complexity per a first image unit with said average complexity of said coded entire moving picture data and for selecting the smaller complexity and for computing newly a QS per a first image unit on the basis of the selected complexity and an prescribed average bit rate; and
a QS adjusting means for adjusting the newly computed QS every second image unit on the basis of said code quantity and an excess or shortage quantity relative to said prescribed average bit rate.

22. The moving picture coding apparatus according to claim 21, wherein first said image unit is a group of pictures (GOP).

23. The moving picture coding apparatus according to claim 21, wherein said second image unit is either of a macro-block or a slice in a picture in a group of pictures (GOP).

24. The moving picture coding apparatus according to claim 21, wherein, in said complexity computing means, said complexity for said first image unit is defined as an average QS concerning the data coded immediately before the present multiplied by said code quantity of said data coded per unit time immediately before the present.

25. The moving picture coding apparatus according to claim 21, wherein, in said average complexity computing means, said average complexity is defined as an average QS concerning the data coded from the beginning up to the present multiplied by said code quantity of said data per unit time coded from the beginning up to the present.

26. The moving picture coding apparatus according to claim 21, wherein, in said QS computing means, said newly computed QS is calculated per a first image unit on the basis of a ratio of said selected complexity to said prescribed average bit rate.

27. The moving picture coding apparatus according to claim 21, wherein, in said QS adjusting means:
a maximum excess code quantity over said prescribed average bit rate is set up;
a buffer of which size is said maximum excess is set up;
an excess quantity over the average bit rate not to exceed a restraint quantity of the buffer size is set up;
data is outputted as said average bit rate from said buffer so that the buffer occupancy indicates an excess quantity over the average bit rate;
available code quantity which is the difference between said maximum excess code quantity and the buffer occupancy of said buffer is calculated; and
said newly computed QS is adjusted on the basis of available code quantity in said buffer so that said excess quantity does not exceed said maximum excess code quantity.

28. The moving picture coding apparatus according to claim 21, wherein, in said QS adjusting means:
a maximum bit rate is set up;
another QS is newly defined as a QS by which said moving picture coding means generates code quantity so as not to exceed said maximum bit rate; and
a larger one of either said another QS or the adjusted QS is sent to said moving picture coding means.

29. The moving picture coding apparatus according to claim 28, wherein said another QS is set up as the case of constant bit rate coding as said maximum bit rate.

30. The moving picture coding apparatus according to claim 21, wherein, in said QS adjusting means,
a minimum QS is set up; and
a larger one of either said minimum QS or the adjusted QS is sent to said moving picture coding means.

31. A moving picture coding apparatus, which comprises:
a moving picture coding means for coding moving picture data by using a quantization scale (QS) and for outputting coded data and code quantity of said moving picture;
a complexity computing means for computing complexity per a first image unit on the basis of said QS and said code quantity;
an average complexity computing means for computing an average complexity of said coded entire moving picture data for the time period from the beginning to the present on the basis of said complexity per a first image unit;

a QS computing means for comparing said complexity per a first image unit with said average complexity of said coded entire moving picture data and for selecting the smaller complexity and for computing newly a QS per a first image unit on the basis of the selected complexity and an prescribed average bit rate; and a QS adjusting means for adjusting the newly computed QS every second image unit on the basis of said code quantity and an excess or shortage quantity relative to said prescribed average bit rate.

32. The moving picture coding apparatus according to claim 31, wherein said first image unit is a group of pictures(GOP).

33. The moving picture coding apparatus according to claim 31, wherein second image uni is either of a macroblock, or a slice in a picture in a group of pictures (GOP).

34. The moving picture coding apparatus according to claim 31, wherein, in said complexity computing means, said complexity for said first image unit is defined as an average QS concerning the data coded immediately before the present multiplied by said code quantity of said data coded per unit time immediately before the present.

35. The moving picture coding apparatus according to claim 31, wherein, in said average complexity computing means, said average complexity is defined as an average QS concerning the data coded from the beginning to the present multiplied by said code quantity of said data per unit time coded from the beginning to the present.

36. The moving picture coding apparatus according to claim 31, wherein, in said QS computing means, said newly computed QS is calculated per a first image unit, on the basis of a ratio of said selected complexity to said average bit rate.

37. The moving picture coding apparatus according to claim 31, wherein, in said QS adjusting means:

a maximum excess code quantity over of said average bit rate is set up;

a buffer of which size is said maximum excess is set up;

data is outputted at said average bit rate from said buffer so that the buffer occupancy indicates an excess quantity over the average bit rate;

available code quantity which is the difference between said maximum excess code quantity and the buffer occupancy of said buffer is calculated; and said newly computed QS is adjusted on the basis of available code quantity in said buffer so that said excess quantity does not exceed said maximum excess code quantity.

38. The moving picture coding apparatus according to claim 31, wherein, in said QS adjusting means:

a maximum bit rate is set up;

another QS is defined as a QS by which said moving picture coding means generates code quantity so as not to exceed said maximum bit rate; and a larger one of either said another QS or the adjusted QS is sent to said moving picture coding means.

39. The moving picture coding apparatus according to claim 38, wherein said another QS is set up as the case of constant bit rate coding at said maximum bit rate.

40. The moving picture coding apparatus according to claim 31, wherein, in said QS adjusting means, a minimum QS is set up; and a larger one of either said minimum QS or the adjusted QS is sent to said moving picture coding means.

* * * * *